US012579411B2

(12) United States Patent
Hersche et al.

(10) Patent No.: US 12,579,411 B2
(45) Date of Patent: Mar. 17, 2026

(54) RESONATOR NETWORK BASED NEURAL NETWORK

(71) Applicant: International Business Machines Corporation, Armonk, NY (US)

(72) Inventors: Michael Andreas Hersche, Zurich (CH); Kumudu Geethan Karunaratne, Gattikon (CH); Giovanni Cherubini, Rueschilkon (CH); Abu Sebastian, Adliswil (CH); Abbas Rahimi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 17/564,275

(22) Filed: Dec. 29, 2021

(65) Prior Publication Data

US 2023/0206035 A1     Jun. 29, 2023

(51) Int. Cl.
| | |
|---|---|
| *G06Q 30/06* | (2023.01) |
| *G06N 3/047* | (2023.01) |
| *G06N 3/048* | (2023.01) |

(52) U.S. Cl.
CPC ............. *G06N 3/048* (2023.01); *G06N 3/047* (2023.01)

(58) Field of Classification Search
CPC ........ G06N 3/048; G06N 3/047; G06N 20/10; G06N 3/045; G06N 3/08; G06N 3/084
See application file for complete search history.

(56) References Cited

U.S. PATENT DOCUMENTS

| | | | | |
|---|---|---|---|---|
| 6,035,057 | A | 3/2000 | Hoffman | |
| 6,404,923 | B1 * | 6/2002 | Chaddha | ................. G06T 9/008 |
| | | | | 382/253 |
| 6,691,083 | B1 | 2/2004 | Breen | |
| 2005/0008260 | A1* | 1/2005 | Kondo | ................... H04N 19/94 |
| | | | | 382/253 |
| 2013/0238346 | A1 | 9/2013 | Vasilache et al. | |
| 2018/0336183 | A1 | 11/2018 | Lee et al. | |
| 2019/0171665 | A1 | 6/2019 | Navlakha et al. | |
| 2019/0179858 | A1* | 6/2019 | Douze | ................. G06F 16/2365 |

(Continued)

FOREIGN PATENT DOCUMENTS

| | | | | |
|---|---|---|---|---|
| CA | 2199588 | A1 * | 9/1998 | ............. G06V 20/13 |
| CN | 109978051 | A | 7/2019 | |

(Continued)

OTHER PUBLICATIONS

Angeline N. Pouget, Resonator Networkd with Sparse Codes to Reduce Prameters in Deep Neural Networks, 2021 (Year: 2021).*

(Continued)

*Primary Examiner* — Hassan Mrabi

(74) *Attorney, Agent, or Firm* — Aaron N. Pontikos

(57) ABSTRACT

A computer-implemented method for performing a classification of an input signal utilizing a neural network includes: computing, by a feature extraction unit of the neural network, a query vector; and performing, by a classification unit, a factorization of the query vector to a plurality of codebook vectors of a plurality of codebooks to determine a corresponding class of a number of classes. A set of combinations of vector products of the plurality of codebook vectors of the plurality of codebooks establishes a number of classes of the classification unit.

17 Claims, 8 Drawing Sheets

310: Receive input signal

320: Compute query vector from input signal

330: Perform a factorization of the query vector

340: Assign class to query vector

(56) References Cited

U.S. PATENT DOCUMENTS

| | | | |
|---|---|---|---|
| 2019/0236167 A1* | 8/2019 | Hu ................... G06F 16/24578 |
| 2019/0266482 A1 | 8/2019 | Erez |
| 2020/0104721 A1* | 4/2020 | Mori ................... G06V 10/761 |
| 2020/0124532 A1 | 4/2020 | Lebeck |
| 2020/0387783 A1 | 12/2020 | Bagherinezhad et al. |
| 2021/0312234 A1* | 10/2021 | Jang ...................... G06F 16/583 |
| 2021/0326756 A1 | 10/2021 | Khaleghi et al. |
| 2022/0229843 A1* | 7/2022 | Srinivasa ............... G06N 3/045 |
| 2023/0206056 A1 | 6/2023 | Hersche et al. |
| 2023/0206057 A1 | 6/2023 | Hersche et al. |
| 2023/0252070 A1 | 8/2023 | Guo |

FOREIGN PATENT DOCUMENTS

| | | | | | |
|---|---|---|---|---|---|
| CN | 110688502 A | * | 1/2020 | ............. | G06F 16/51 |
| CN | 114282035 A | * | 4/2022 | ............. | G06F 16/51 |
| CN | 111382845 B | * | 9/2022 | ........... | G06K 9/6202 |
| JP | 0945852 A1 | * | 9/1999 | ........... | G10L 21/038 |
| JP | 2000305597 A | * | 11/2000 | ............. | G10L 19/12 |
| JP | 2004357062 A | * | 12/2004 | ........... | H04B 7/0691 |
| JP | 4624552 B2 | * | 2/2011 | ........... | G10L 21/038 |
| JP | 2015-026922 A | | 2/2015 | | |
| JP | 2020024524 A | | 2/2020 | | |
| KR | 20100120077 A | * | 11/2010 | ........... | H04B 7/0691 |
| KR | 20130107335 A | * | 10/2013 | ......... | G06F 16/2365 |
| WO | 2020/238293 A1 | | 12/2020 | | |

OTHER PUBLICATIONS

Lei Huang et al. "Orthogonal Weight Normalization: Solution to Optimization over Multiple Dependent Stiefel Manifolds in Deep Neural Networks", https://arxiv.org/abs/1709.06079v2 (Year: 2017), 20 pages.
Angeline Pouget, "Resonator Networks with Sparse Codes to Reduce Parameters in Deep Neural Networks", ETH Zurich Bachelor's Project. (Year: 2021), 46 pages.
Charu Aggarwal, "Neural Networks and Deep Learning", A Textbook. (Year: 2018), 64 pages.
E. Paxon Frady et al. "Resonator Networks, 1: An Efficient Solution for Factoring High-Dimensional, Distributed Representations of Data Structures", https://doi.org/10.1162/neco_a_01331 (Year: 2020), 21 pages.
Elad Hoffer et al. "Fix your Classifier: The marginal value of training the last weight layer", https://arxiv.org/abs/1801.04540v2 (Year: 2018), 11 Pages.
Gabi Shalev et al. "Redesigning the Classification Layer by Randomizing the Class Representation Vectors". https://arxiv.org/abs/2011.08704v2 (Year: 2020), 11 pages.
Jiankang Deng et al. "ArcFace: Additive Angular Margin Loss for Deep Face Recognition", https://arxiv.org/abs/1801.07698v3 (Year: 2019), 17 Pages.
Itay Hubara et al. "Binarized Neural Networks", https://doi.org/10.5555/3157382.3157557 (Year: 2016), 9 pages.
Luisa Mico et al. "A fast branch & bound nearest neighbour classifier in metric spaces", Pattern Recognition Letters 17, (Year: 1996), pp. 731-739.
Maxence Delorme, "An Introduction to Cellular Automata" in Cellular Automata: A Parallel Model. (Year: 1999), 45 pages.
Robert French, "Using Semi-Distributed Representations to Overcome Catastrophic Forgetting in Connectionist Networks", (Year: 1993), 8 pages.
Ronald Kneusel, "Random Nos. and Computers", https://doi.org/10.1007/978-3-319-77697-2 (Year: 2018), 47 pages.
Jayakumar, et al., Top-KAST: Top-K Always Sparse Training, arXiv:2106.03517v1 [cs.LG], Jun. 7, 2021, 14 pages.
Kleyko, et al., Cellular Automata Can Reduce Memory Requirements of Collective-State Computing, arXiv:2010.03585v1, Oct. 7, 2020, 13 pages.

Monner, et al., Emergent Latent Symbol Systems In Recurrent Neural Networks, Connection Science 24.4, Oct. 15, 2012 vol. 24, No. 4, pp. 193-225.
Shi, et al., Understanding Top-k Sparsification in Distributed Deep Learning, arXiv:1911.08772 [cs.LG], Nov. 20, 2019, 14 pages.
Hersche et al., "Factorizing Hypervectors", U.S. Appl. No. 17/564,277, filed Dec. 29, 2021.
Tersche et al., "Neural Network With Fixed Classification Matrix", U.S. Appl. No. 17/564,279, filed Dec. 29, 2021.
List of IBM Patents or Patent Applications Treated as Related, Filed Dec. 29, 2021, 2 pages.
Albarakati, Noor, "Fast Neural Network Algorithm for Solving Classification Tasks", A thesis submitted in partial fulfillment of the requirements for the degree of Master of Science at Virginia Commonwealth University, Virginia Commonwealth University, Richmond, Virginia, 2012, 70 pages.
Chris, "Reducing trainable parameters with a Dense-free ConvNet classifier", Jan. 31, 2020, Last updated on Nov. 5, 2020, MachineCurve, 24 pages, <https://www.machinecurve.com/index.php/2020/01/31/reducing-trainable-parameters-with-a-dense-free-convnet-classifier/>.
Eidnes et al., "Shifting Mean Activation Towards Zero With Bipolar Activation Functions", Workshop track—ICLR 2018, arXiv:1709.04054v3 [stat.ML] Mar. 15, 2018, 13 pages.
Fiori, Simone, "Quasi-Geodesic Neural Learning Algorithms Over the Orthogonal Group: A Tutorial", Journal of Machine Learning Research 6 (2005) pp. 743-781, Published May 5, 2005.
Frady et al., "Resonator networks for factoring distributed representations of data structures", Neural Computation, 2020, arXiv:2007.03748v1 [cs.CV] Jul. 7, 2020, 20 pages.
Frady et al., "Resonator Networks, 1: An Efficient Solution for Factoring High-Dimensional, Distributed Representations of Data Structures", Neural Computation, 32, 1-21 (2020), doi: 10.1162/neco_a_01331.
Hoffer et al., "Fix Your Classifier: The Marginal Value of Training the Last Weight Layer", Published as a conference paper at ICLR 2018, arXiv:1801.04540v2 [cs.LG] Mar. 20, 2018, 11 pages.
Kent et al., "Resonator Circuits for factoring high-dimensional vectors", <https://www.arxiv-vanity.com/papers/1906.11684/>, 30 pages, downloaded from the Internet on Apr. 22, 2021.
Kent et al., "Resonator Networks outperform optimization methods at solving high-dimensional vector factorization", Neural Computation, 2020, arXiv:1906.11684v4 [cs.NE] Jul. 14, 2020, 61 pages.
Kent et al., "Resonator Networks, 2: Factorization Performance and Capacity Compared to Optimization-Based Methods", Neural Computation 32, pp. 2332-2388 (2020), https://doi.org/10.1162/neco_a_01329.
Kotliarov et al., "Hybrid neural network for classification problem solving", Cent. Eur. J. Comp. Sci. • 4(2) • 2014 • 86-94, DOI: 10.2478/s13537-014-0206-5.
Laiho et al., "High-Dimensional Computing with Sparse Vectors", 2015 IEEE Biomedical Circuits and Systems Conference (BioCAS), Oct. 22-24, 2015, Atlanta, GA, USA, DOI:10.1109/BioCAS.2015.7348414, 4 pages.
Lin et al., "Network In Network", arXiv:1312.4400v3 [cs.NE] Mar. 4, 2014, 10 pages.
Mell et al., "The NIST Definition of Cloud Computing", Recommendations of the National Institute of Standards and Technology, NIST Special Publication 800-145, Sep. 2011, 7 pages.
Qian et al., "Do We Need Fully Connected Output Layers in Convolutional Networks?", arXiv:2004.13587v2 [cs.CV] Apr. 29, 2020, 8 pages.
Shalev et al., "Redesigning the Classification Layer by Randomizing the Class Representation Vectors", arXiv:2011.08704v2 [cs.LG] Nov. 29, 2020, 11 pages.
Talathi et al., "Improving Performance of Recurrent Neural Network With Relu Nonlinearity", Workshop track—ICLR 2016, 12 pages.
Wu, Chai Wah, "ProdSumNet: reducing model parameters in deep neural networks via product-of-sums matrix decompositions", arXiv:1809.02209v2 [cs.LG] May 23, 2019, 10 pages.

(56)            References Cited

OTHER PUBLICATIONS

Xie et al., "All You Need is Beyond a Good Init: Exploring Better Solution for Training Extremely Deep Convolutional Neural Networks with Orthonormality and Modulation", arXiv:1703.01827v3 [cs.CV] Apr. 10, 2017, 11 pages.
Zhao et al., "Explicit Sparse Transformer: Concentrated Attention Through Explicit Selection", arXiv:1912.11637v1 [cs.CL] Dec. 25, 2019, 15 pages.

* cited by examiner

Input Signal

101

$q \in \mathbb{R}^D$

110

120

$y \in \mathbb{R}^C$

Output

C classes $y = Wq$

Feature extraction    Classification

100

210x
210y
211x
211y    212x
213x
213y $q$ $q \odot \hat{y} \odot \hat{z}$    $\tilde{x}$    $X^T$    $a_x$    $X$    $\hat{x}$    220x class/label $q \odot \hat{x} \odot \hat{z}$    $\tilde{y}$    $Y^T$    $a_y$    $Y$    $\hat{y}$    220y 212y    220z $q \odot \hat{x} \odot \hat{y}$    $\tilde{z}$    $Z^T$    $a_z$    $Z$    $\hat{z}$ 210z    211z    212z    213z Resonator network

200

310: Receive input signal

320: Compute query vector from input signal

330: Perform a factorization of the query vector

340: Assign class to query vector

300

Feature extraction
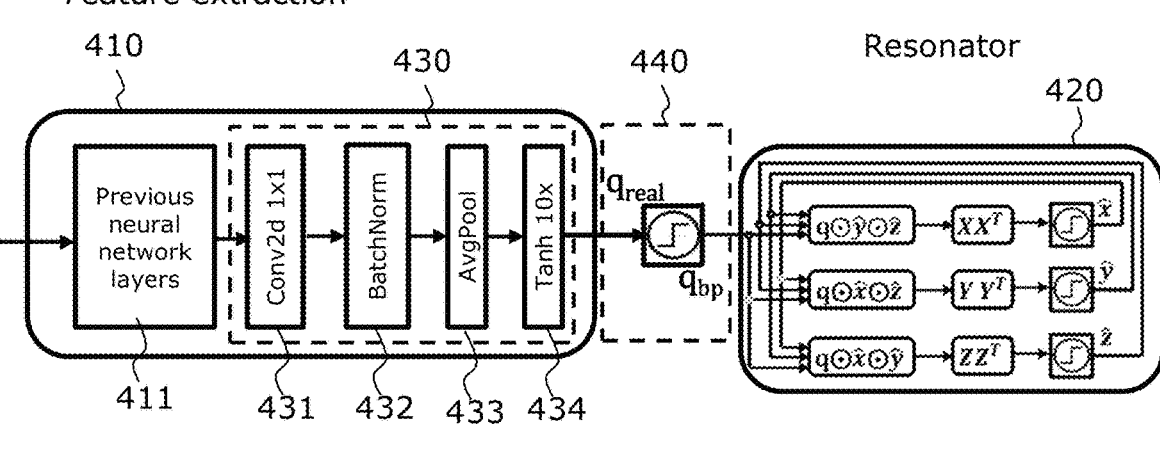
FIG. 4a     400a
Feature extraction
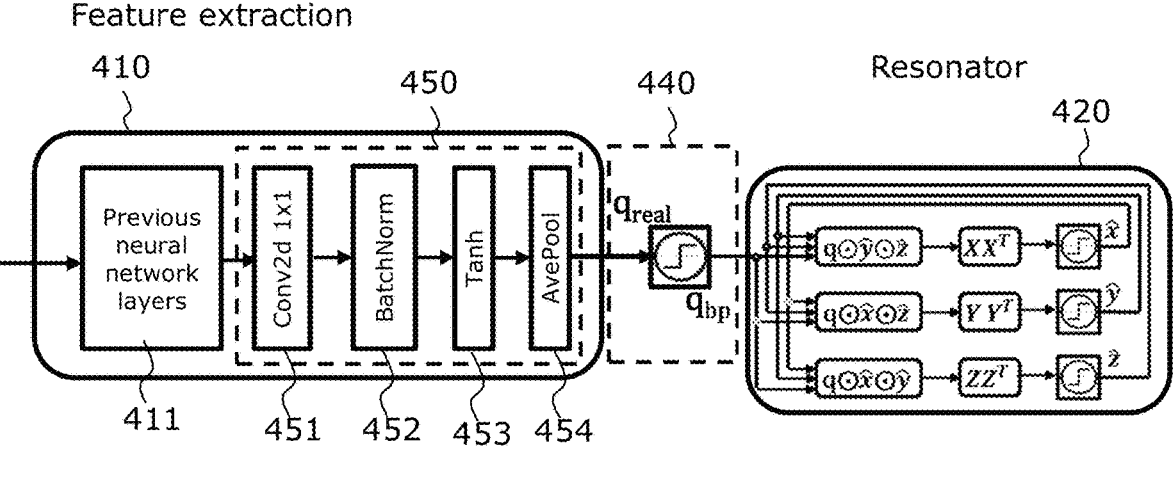
FIG. 4b     400b

| Various types of fully-connected layer | Acc [%] 510 | Acc [%] 520 |
|---|---|---|
| Fixed bipolar resonator network with $q_{real}$ | 58.21 | 58.96 | 530 |
| Fixed bipolar resonator network with $q_{bp}$ | 57.80 | 58.70 | 540 |

500

Resonator network with $q_{real}$ and tanh 10x activation

600

710     720

| Resonator strategy | Real-valued query | Bipolarized query | |
|---|---|---|---|
| Last estimation | 57.82% | 56.54% | 730 |
| Majority | 58.23% | 57.09% | 740 |
| Max sum Hamming sim. | 58.21% | 57.12% | 750 |
| Max Hamming product sim. | 58.09% | 56.95% | 760 |
| Max sum Hamming sim. | 58.96% | 58.70% | 770 |

Last 100 steps

All steps

700

RESONATOR NETWORK BASED NEURAL NETWORK

BACKGROUND

The present invention relates to the field of neural networks, and more specifically, to a neural network including a feature extraction unit and a classification unit.

Neural networks are commonly used as models for classification for a wide variety of tasks. Typically, a learned affine transformation is placed at the end of such models, yielding a per-class value used for classification. This classifier can have a vast number of parameters, which grows linearly with the number of possible classes, thus requiring increasingly more resources for storage and computations.

SUMMARY

According to one embodiment of the present invention, a computer-implemented method for performing a classification of an input signal utilizing a neural network is disclosed. The computer-implemented method includes computing, by a feature extraction unit of the neural network, a query vector. The computer-implemented method further includes performing, by a classification unit, a factorization of the query vector to a plurality of codebook vectors of a plurality of codebooks to determine a corresponding class of a number of classes. A set of combinations of vector products of the plurality of codebook vectors of the plurality of codebooks establishes a number of classes of the classification unit.

According to another embodiment of the present invention, a computer program product for performing a classification of an input signal utilizing a neural network is disclosed. The computer program product includes one or more computer readable storage media and program instructions stored on the one or more computer readable storage media. The program instructions include instructions to compute, by a feature extraction unit of the neural network, a query vector. The program instructions further include instructions to perform, by a classification unit, a factorization of the query vector to a plurality of codebook vectors of a plurality of codebooks to determine a corresponding class of a number of classes. A set of combinations of vector products of the plurality of codebook vectors of the plurality of codebooks establishes a number of classes of the classification unit.

According to another embodiment of the present invention, a computer system for performing a classification of an input signal utilizing a neural network is disclosed. The computer system includes one or more computer system includes one or more computer processors, one or more computer readable storage media, and program instructions stored on the computer readable storage media for execution by at least one of the one or more processors. The program instructions include instructions to compute, by a feature extraction unit of the neural network, a query vector. The program instructions further include instructions to perform, by a classification unit, a factorization of the query vector to a plurality of codebook vectors of a plurality of codebooks to determine a corresponding class of a number of classes. A set of combinations of vector products of the plurality of codebook vectors of the plurality of codebooks establishes a number of classes of the classification unit.

BRIEF DESCRIPTION OF THE SEVERAL VIEWS OF THE DRAWINGS

FIG. 4a is an exemplary resonator based neural network having an interface 430, generally designated 400a, in accordance with at least one embodiment of the present invention.

FIG. 4b is an exemplary resonator based neural network having an interface 450, generally designated 400b, in accordance with at least one embodiment of the present invention.

DETAILED DESCRIPTION

Figure 1:
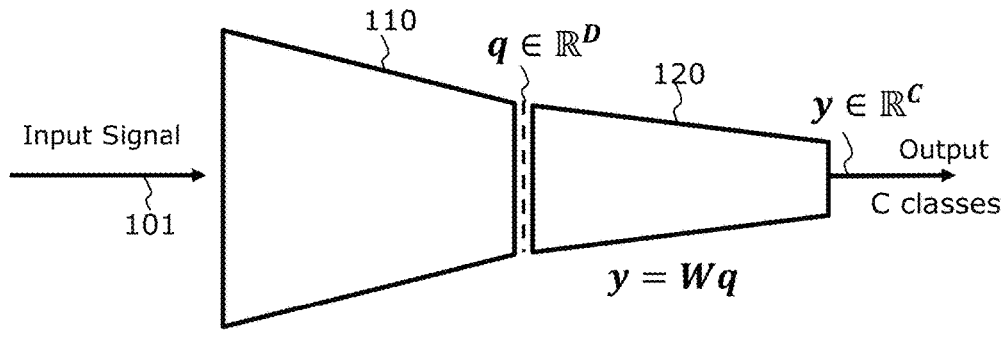
FIG. 1 is a simplified schematic block diagram of a neural network, generally designated 100, in accordance with at least one embodiment of the present invention. according to an embodiment of the invention.

The present invention relates to the field of neural networks, and more specifically, to a neural network including a feature extraction unit and a classification unit.

Embodiments of the present invention recognize that fully-connected layers are still commonly used as classification layers in various neural network architectures, transforming from the dimension of network features D to the number of required class categories C. Therefore, each classification model must hold D×C number of trainable parameters that grows in a linear manner with the number of classes (i.e., C). Accordingly, embodiments of the present invention recognize that there is a need for improved neural network architectures with reduced complexity.

High-dimensional (HD) computing is a brain-inspired non von Neumann machine learning model based on representing information with high-dimensional vectors. A processor based on HD computing may be seen as an extremely wide dataflow processor with a small instruction set of bit-level operations.

High-dimensional computing represents information by projecting data onto vectors in a high-dimensional space. HD vectors may be embodied by holographics and (pseudo) random with independent and identically distributed (i.i.d.) components. High-dimensional computing may also be denoted as hyperdimensional computing. High-dimensional vectors may also be denoted as hypervectors. According to embodiments of the present invention, the high-dimensional vectors/hypervectors may have dimensions of more than 100 elements, of more than 1,000 elements or of more than 10,000 elements.

Given a hypervector formed from an element-wise product of two or more atomic hypervectors (each from a fixed codebook), a resonator network may find its factors. The resonator network may iteratively search over the alternatives for each factor individually rather than all possible combinations until a set of factors is found that agrees with the input hypervector/query vector. The term "resonator network" as used herein may be defined in accordance with the following references: E. Paxon Frady et al. ("Resonator networks for factoring distributed representations of data structures," Neural Computation 2020) and Spencer J. Kent et al. ("Resonator Networks outperform optimization methods at solving high-dimensional vector factorization," Neural Computation 2020).

According to various embodiments of the present invention, a neural network comprising a feature extraction unit and a classification unit is provided. In an embodiment, the classification unit includes a resonator network. The resonator network is configured to provide a plurality of codebooks, in which each codebook includes a set of codebook vectors. A set of combinations of the vector products of the codebook vectors of the plurality of codebooks establishes a number of classes of the classification unit. The neural network is further configured to compute, by the feature extraction unit, a query vector and to perform a factorization of the query vector to each codebook vector to determine a corresponding class of the number of classes.

In an embodiment, a resonator network is used to perform the classification. The set of combinations of the vector products of the codebook vectors establish a label space of classification. Such an embodiment is a highly efficient method which is particularly useful for classification tasks having a high number of classes. Furthermore, the resonator network is a very compact approach for performing the classification task.

In an embodiment, the classification problem in a fully connected layer described as a high-dimensional vector factorization problem. According to such an embodiment, the trainable parameters in a fully-connected layer are replaced with codebook vectors arranged in a number of codebooks with the help of a resonator network.

In an embodiment, the neural network is trained with a fixed classification matrix W as a quasi-orthogonal matrix built from F number of codebooks, wherein F is an integer. The classification matrix W may be constructed by considering all possible combinations of the vector products out of these F codebooks.

In an embodiment, the query vector is a D-dimensional query vector, and the number of classes is C, wherein C and D are integers. In an embodiment, C and D may be different. In other words, embodiments of the present invention can provide for the classification of a feature/query vector to a number of classes that is higher than the dimension D of the query vector. More generally, embodiments of the prevention can be applied to classification problems with any number of classes (C). In an embodiment, the D-dimensional query vector is a bipolarized query vector.

In an embodiment, during an inference phase, the classification matrix W is replaced by the resonator network. A query vector that is received by the classification unit is then factorized to a set of codebook vectors by the resonator network. In an embodiment, every codebook has $$\sqrt[F]{C}$$

D-bit codebook vectors. in an embodiment, each codebook is embodied as a fixed codebook. The fixed codebooks represent a fixed classification matrix W in a compact form. According to such an embodiment, a fully connected classification layer is substituted by the resonator network. In an embodiment, each codebook is embodied as a bipolar codebook comprising a bipolar codebook vector.

In an embodiment, the neural network includes a vector interface between the feature extraction unit and the classification unit. The vector interface is configured to bipolarize the query vector. As bipolar operations may be performed significantly faster, the implementation of such a vector interface may provide significant advantages in terms of speed.

In an embodiment, the neural network is configured to perform unbinding operations in parallel for the plurality of codebooks. In other words, the resonator network performs a parallel estimation/computation of the respective factors of the factorization. This leads to higher accuracy.

In an embodiment, the neural network is configured to perform a training phase of the feature extraction unit, wherein the resonator network remains unchanged during the training phase. In an embodiment, the feature extraction unit includes an activation layer configured to apply a tan h-function as activation function. It should be appreciated that the use of the hyperbolic tangent (tan h) function provides advantageous accuracy results for classification problems. In an embodiment, the feature extraction unit includes a pooling layer and an activation layer, wherein the pooling layer is arranged before the activation layer. It should be appreciated that such an arrangement provides advantageous accuracy results for classification problems.

In an embodiment, the pooling layer is embodied as an average pooling layer. In an embodiment, the activation layer is configured to apply a sharpened tan h-function as an activation function. The sharpened tan h-function may be, for example, a tan h 5× function or a tan h 10× function, or more generally, a tan h ax function, wherein a>1. It should be appreciated that the use of such sharpened hyperbolic tangent (tan h) functions provide advantageous accuracy results for classification problems, particularly in combination with an arrangement where the pooling layer is arranged before the activation layer, and more particularly in combination with an average pooling layer.

According to various embodiments of the present invention, advantageous decoding strategies are provided for cases in which the factorization does not converge. In an embodiment, the neural network is configured to select, in cases in which the factorization of the query vector to the codebook vectors does not converge, the factorization which has occurred most often within a predefined set of iterations. The predefined set of iterations may encompass all iteration steps or a predefined number of the last iteration steps (e.g., the last 100 iteration steps).

In an embodiment, the neural network is configured to select, in cases in which the factorization of the query vector to the codebook vectors does not converge, the factorization within a predefined set of iterations which has the maximum sum Hamming similarity to a respective combination of vector products of the codebook vectors. The predefined set of iterations may encompass all iteration steps or a predefined number of the last iteration steps (e.g., the last 100 iteration steps).

In an embodiment, the neural network is configured to select, in cases in which the factorization of the query vector to the codebook vectors does not converge, the factorization within a predefined set of iterations with the maximum Hamming similarity between the query vector and a respective estimated vector product. The predefined set of iterations may encompass all iteration steps or according or a predefined number of the last iteration steps (e.g., the last 100 iteration steps).

In an embodiment, the neural network is configured to perform a training phase, in which the training phase is configured to minimize a loss function computed as follows:

$$\mathcal{L}_{CET}(q_i, y_i) = -\log \frac{e^{scos\left(\theta_{q_i,w_{y_i}}+m\right)}}{e^{scos\left(\theta_{q_i,w_{y_i}}+m\right)} + \sum_{j \neq y_i} e^{scos\left(\theta_{q_i,w_j}\right)}};$$ equation 1.

In equation 1 above, $q_i$ denotes a query vector of iteration i, $y_i$ denotes the output vector of iteration i, and s and m are hyperparameters to guide the neural network for generating improved quasi-orthogonal query vectors and maximizing the inter-class separability and intra-class compactness. This is in part due to the additional angular margin introduced by the parameter m. Such loss functions are described, in further detail, with reference to ArcFace (Deng et. al, "Arcface: Additive angular margin loss for deep face recognition," IEEE CVPR 2019).

The term "quasi-orthogonal vectors as used herein shall be understood as vectors that are orthogonal to each other with a predefined probability which increases with growing dimension D. The predefined probability may have a discrete binomial distribution, which can be approximated by a normal distribution with standard deviation that scales with factor $(1/(\sqrt{D})$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a simplified schematic block diagram of a neural network, generally designated 100, in accordance with at least one embodiment of the present invention. The neural network 100 includes a feature extraction unit 110 and a classification unit 120. The feature extraction unit 110 is configured to receive an input signal 101 (e.g. a digital image). The feature extraction unit 110 is further configured to extract a query vector q from the input signal 101, more particularly to compute a D-dimensional query vector from the input signal 101, wherein D is an integer. The feature extraction unit 110 may generally be defined as a unit which maps the input signal to a query vector, wherein the query vector describes the input signal with a reduced number of resources. For this, the feature extraction unit 110 may include one or more convolutional layers which perform an abstraction of the input signal. The one or more convolutional layers convolve the respective input signal and pass its result to the next layer. The computed query vector is then passed to the classification unit 120.

The classification unit 120 is configured to provide a fixed classification matrix W (i.e. a classification matrix which has elements that are not going to be trained during a training phase of the neural network 100, but rather stay fixed during the training phase). In an embodiment, the fixed classification matrix W may be built from random codes and implemented in various ways.

In an embodiment, the classification unit 120 is configured to map a respective query vector q to a corresponding class of a number of classes C, wherein C is an integer. In an embodiment, a fixed classification matrix is used to perform a classification of the query vector (i.e. to assign the query vector to one class of a number of classes which has the closest similarity to the query vector). For this, the classification unit may perform a matrix vector multiplication of the fixed classification matrix W with the vector q, more particularly $y=Wq$, wherein $y \in \mathbb{R}^C$. In an embodiment, the fixed classification matrix may be formed by a set of C fixed D-dimensional and quasi-orthogonal bipolar vectors, which ultimately form a fixed quasi-orthogonal matrix.

In an embodiment, the D-dimensional and quasi-orthogonal bipolar vectors form a D-dimensional vector space. In general, each of the D-dimensional and quasi-orthogonal vectors include D numbers that define the coordinates of a point in the vector space. In an embodiment, the D-dimensional vectors are in $\{-1, +1\}^D$ and are hence referred to as "bipolar."

As mentioned above, according to further embodiments of the present invention, the neural network 100 is configured to perform a training phase, while the fixed classification matrix W provided by the resonator network remains constant/unchanged during the training. During the training phase, training data is fed into the neural network 100 and a corresponding feedback loop aims at minimizing a loss function. The training phase, which may also be denoted as learning phase, is used to adapt the parameters in the rest of the neural network 100 (apart from the fixed resonator network), in order to increase the accuracy of the classification.

In an embodiment, loss functions with two hyperparameters (s, m) are used to guide the neural network 100 for generating improved quasi-orthogonal query vectors. These two hyperparameters may effectively control the inter-class separability and intra-class compactness. In an embodiment, such loss functions may also be used in distributed communications where the feature extraction unit 100 and the classification unit 120 are physically disjoint.

In an embodiment, the neural network 100 is configured to perform a training phase, during which a loss function $\mathcal{L}_{CET}$ is minimized as follows:

$$\mathcal{L}_{CET}(q_i, y_i) = -\log \frac{e^{s\cos\left(\theta_{q_i, w_{y_i}} + m\right)}}{e^{s\cos\left(\theta_{q_i, w_{y_i}} + m\right)} + \sum_{j \neq y_i} e^{s\cos\left(\theta_{q_i, w_j}\right)}}; \qquad \text{equation 2.}$$

In equation 2 above, $q_i$ denotes a query vector of iteration i, $y_i$ denotes the output vector of iteration i, and s and m are hyperparameters to guide the neural network 100 for generating improved quasi-orthogonal query vectors and maximizing the inter-class separability and intra-class compactness. This stems from the additional angular margin introduced by the parameter m.

Figure 2:
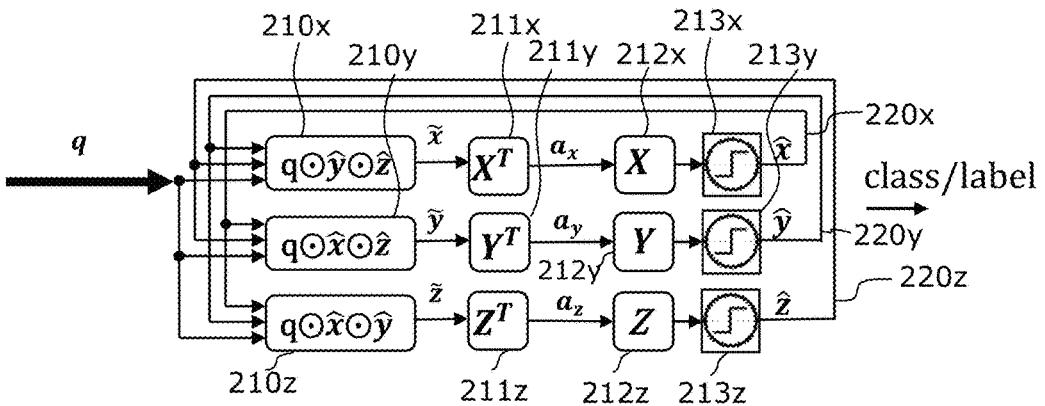
FIG. 2 illustrates an implementation of a fixed classification matrix W presented in a resonator network, generally designated 200, in accordance with at least one embodiment of the present invention.

FIG. 2 illustrates an implementation of a fixed classification matrix W presented in a resonator network, generally designated 200, in accordance with at least one embodiment of the present invention. According to FIG. 2, the neural network 100 includes a resonator network 200 as the classification unit. More particularly, the classification unit 120 of FIG. 1 may be implemented by the resonator network 200 as shown in FIG. 2 in accordance with at least one embodiment of the present invention. According to such an embodiment, the random quasi-orthogonal bipolar matrix W may be built from F codebooks in the resonator network 200, wherein F is an integer. The resonator network 200 may be generally configured to provide a plurality of F codebooks.

As depicted in FIG. 2, the resonator network 200 includes F=3 codebooks X, Y and Z. F may also be denoted as the number of factors of the factorization. The codebook X includes m codebook vectors $x_1 \ldots x_m$, wherein m is an integer. The codebook Y includes m codebook vectors $y_1 \ldots y_m$. The codebook Z includes m code book vectors $z_1 \ldots z_m$. The transpose $W^T$ of the classification matrix can then be represented as:

$$W^T = \{w_1, w_2, \ldots, w_C\}.$$

The corresponding elements of $W^T$ may then be represented as follows:

$$w_1 = x_1 \odot y_1 \odot z_1$$

$$w_2 = x_2 \odot y_1 \odot z_1$$

$$\vdots$$

$$w_C = x_m \odot y_m \odot z_m$$

The resonator network 200 includes three network nodes 210x, 210y and 210z. The three network nodes 210x, 210y and 210z are configured to perform an elementwise multiplication $\odot$ of three input signals including the query vector q. The resonator network 200 further includes memories 211x, 211y and 211z for storing the transposes of the codebooks $X^T$, $Y^T$ and $Z^T$, respectively. The resonator network 200 may further comprise memories 212x, 212y and 212z for storing the codebooks X, Y and Z respectively. The resonator network 200 further includes non-linear units 213x, 213y and 213z, which are configured to perform a non-linear operation, (e.g., the sign function). The resonator network 200 further includes three processing lines 220x, 220y and 220z respectively, wherein each processing line provides an estimate of a codebook vector for the factorization of the respective query vector q. More particularly, the processing line 220x provides estimates $\hat{x}$, the processing line 220y provides estimates $\hat{y}$ and the processing line 220z provides estimates $\hat{z}$.

During an inference phase of the neural network 100, the neural network 100 receives an input signal 101 (e.g. an image), and the feature extraction unit 110 computes a corresponding query vector q. The feature extraction unit 110 provides this query vector q as the input signal 101 to the resonator network 200 for performing a classification. The factorization of the query vector q to the codebook vectors can then be performed as follows. At an initial point in time t=0, the resonator network 200 may initialize an estimate of the codebook vectors that factorize the query vector (e.g. an estimate representing a superposition of all candidate codebook vectors) as follows:

$$\hat{x}(0) = \text{sign}\left(\sum_{h=1,\ldots,m} x_h\right);$$

-continued $$\hat{y}(0) = \text{sign}\left(\sum_{j=1,\ldots,m} y_j\right); \text{ and}$$

$$\hat{z}(0) = \text{sign}\left(\sum_{k=1,\ldots,m} z_h\right).$$

The computations of the resonator network 200 may then be described for a current iteration i as follows: The network nodes 210x, 210y and 210z receive simultaneously or substantially simultaneously the respective triplet (q, $\hat{y}$(i), $\hat{z}$(i)), (q, $\hat{x}$(i), $\hat{z}$(i)) and (q, $\hat{x}$(i), $\hat{y}$(i)). The network nodes then compute the first estimates $\tilde{x}$(i), $\tilde{y}$(i) and $\tilde{z}$(i) of the codebook vectors that represent the factorization of the query vector as follows:

$$\tilde{x}(i) = q \odot \hat{y}(i) \odot \hat{z}(i);$$

$$\tilde{y}(i) = q \odot \hat{x}(i) \odot \hat{z}(i);$$

$$\tilde{z}(i) = q \odot \hat{x}(i) \odot \hat{y}(i),$$

where $\odot$ refers to an elementwise multiplication. This may be referred to as an inference step. In other words, the nodes perform the inference step on the respective input triplets.

The similarity of the first estimate $\tilde{x}$(i) with each of the m codebook vectors $x_1 \ldots x_m$ is computed using the transpose codebook $X^T$ stored in memory 211x as follows: $a_x(i) = X^T \tilde{x}$(i)$\in \mathbb{R}^m$. Here, the hypervector $\tilde{x}$(i) is multiplied by the transpose codebook $X^T$. The similarity of the first estimate $\tilde{y}$(i) with each of the m code hypervectors $y_1 \ldots y_m$ is computed using the transpose codebook $Y^T$ stored in memory 211y as follows: $a_y(i) = Y^T \tilde{y}$(i)$\in \mathbb{R}^m$ for multiplying the hypervector $\tilde{y}$(i) by the matrix $Y^T$. The similarity of the first estimate $\tilde{z}$(i) with each of m codebook vectors $z_1 \ldots z_m$, is computed using the transpose codebook $Z^T$ stored in memory 211z as follows: $a_z(i) = Z^T \tilde{z}$(i)$\in \mathbb{R}^m$ for multiplying the hypervector $\tilde{z}$(i) by the matrix $Z^T$. The resulting vectors $a_x(i)$, $a_y(i)$ and $a_z(i)$ may be denoted similarity vectors. The largest element of each of the similarity vectors $a_x(i)$, $a_y(i)$ and $a_z(i)$ indicates the codebook vector which matches best the first estimate $\tilde{x}$(i), $\tilde{y}$(i) and $\tilde{z}$(i) respectively.

After obtaining the similarity vectors $a_x(i)$, $a_y(i)$ and $a_z(i)$, a weighted superposition of the similarity vectors $a_x(i)$, $a_y(i)$ and $a_z(i)$ is performed using the codebooks X, Y and Z stored in memories 212x, 212y, and 212z, respectively. This may be performed by the following matrix vector multiplications: $Xa_x(i)$, $Ya_y(i)$ and $Za_z(i)$. The resulting vectors $Xa_x(i)$, $Ya_y(i)$ and $Za_z(i)$ are forwarded to the sign units 213x, 213y and 213z, respectively. As a result, an output of the sign units may be computed as follows:

$$\hat{x}(i+1) = \text{sign}(Xa_x(i));$$

$$\hat{y}(i+1) = \text{sign}(Ya_y(i)); \text{ and}$$

$$\hat{z}(i+1) = \text{sign}(Za_z(i)), \text{ respectively.}$$

Accordingly, new estimates of the hypervectors $\hat{x}$(i+1), $\hat{y}$(i+1) and $\hat{z}$(i+1) have been computed for the next iteration i+1. The iterative process may stop if a conversion criterion or a stopping criterion is fulfilled. In an embodiment, the conversion criterion may, require that $\hat{x}$(i+1)=$\tilde{x}$(i), $\hat{y}$(i+1)=$\hat{y}$(i) and $\hat{z}$(i+1)=$\hat{z}$(i). In other words, the iterative algorithm has converged, and the estimates no longer change. In an embodiment, the stopping criterion may require that a maximum number of iterations (e.g., 100 iterations) have been reached.

In an embodiment, the resonator network 200 may perform the unbinding operations in parallel for all the codebooks (i.e. the codebooks X, Y and Z). This leads to a higher accuracy. In other words, the resonator network 200 performs a parallel execution/computation of the F factors. During inferencing, the resonator network 200, with parallel execution of F factors, costs $$O\left(D \times F \times \sqrt[F]{C}\right)$$

in memory and $O(\alpha)$ in computation, where $\alpha \sim 0.001 \times C$ when C is large (above a predetermined threshold).

Figure 3:
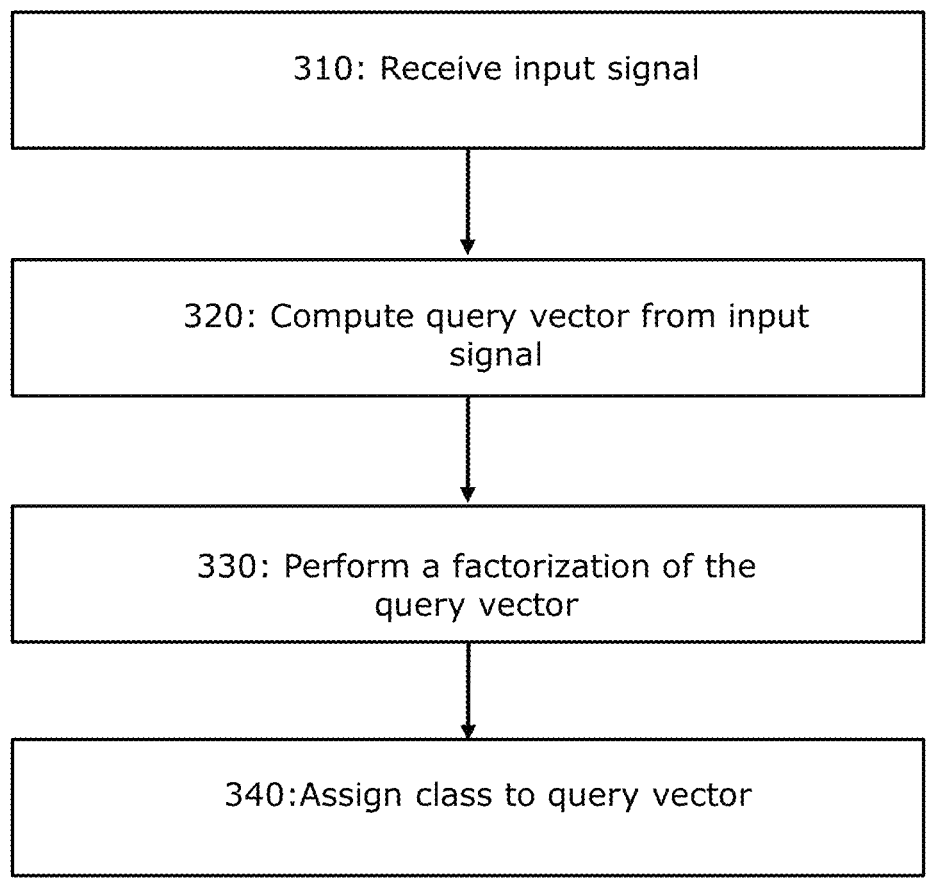
FIG. 3 is a flow chart of a method for performing a classification of a query vector, generally designated 300, in accordance with at least one embodiment of the present invention.

FIG. 3 is a flow chart of a method for performing a classification of a query vector, generally designated 300, in accordance with at least one embodiment of the present invention. At a step 310, the neural network 100 receives an input signal (e.g., the input signal 101 as depicted in FIG. 1). At step 320, a feature extraction unit of a neural network (e.g., the feature extraction unit 110 of the neural network 100 depicted in FIG. 1) computes a query vector. At step 330, a resonator network (e.g., the resonator network 200 depicted in FIG. 2) of a neural network computes a factorization of the query vector to the codebook vectors of the plurality of codebooks to determine a corresponding class of the number of classes. This may involve several iterations. At step 340, a class is assigned to the query vector.

In an embodiment, step 330 may be completed or stopped at the point in which the factorization converges and the class to which the factorization has converged is assigned to the query vector.

FIG. 4a is an exemplary resonator based neural network having an interface 430, generally designated 400a, in accordance with at least one embodiment of the present invention. The neural network 400a includes a feature extraction unit 410, a classification unit 420, an interface 430 to the classification unit 420, and a vector interface 440 between the interface 430 and the classification unit 420. The interface 430 includes a final convolutional layer 431, a batch-normalization layer 432, an average pooling layer 433, and an activation layer 434.

The feature extraction unit 410 includes a plurality of previous neural network layers 411 and a final convolutional layer 431. As depicted, an input signal, such as an image, has been provided and processed by the plurality of previous neural network layers 411. The output of the previous neural network layers 411 is provided to the final convolutional layer 431. As depicted, the final convolutional layer 431, as well as the previous network/convolutional layers 411, are a 2-dimensional convolutional layer with a 1×1 filter (i.e., "Conv2d 1×1").

The output of the final convolutional layer 431 is processed by a batch-normalization layer 432, which is configured to perform a batch normalization process. The output of the batch-normalization layer 432 is fed to an average pooling layer 433, which is configured to perform a pooling operation. The pooling operation may, for example, calculate an average value for portions of a feature map. The output of the average pooling layer 433 is fed to an activation layer 434. The activation layer 434 is configured to apply an activation function. As depicted, the activation layer 434 is configured to apply a sharpened tan h 10× activation function. The output of the activation layer 434 establishes a real-valued query vector $g_{real}$.

The vector interface 440 is configured to bipolarize the real-valued query vector $q_{real}$ into a bipolar or bipolarized query vector $q_{bp}$.

FIG. 4b is an exemplary resonator based neural network having an interface 450, generally designated 400b, in accordance with at least one embodiment of the present invention. The neural network 400b includes a feature extraction unit 410, a classification unit 420, an interface 450 to the classification unit 420, and a vector interface 440 between the interface 450 and the classification unit 420. The interface 450 includes a final convolutional layer 451, a batch-normalization layer 452, an activation layer 453, and an average pooling layer 454.

The feature extraction unit 410 includes a plurality of previous neural network layers 411 and a final convolutional layer 451. As depicted, an input signal, such as an image, has been provided and processed by the plurality of previous neural network layers 411. The output of the previous neural network layers 411 is provided to the final convolutional layer 451. As depicted, the final convolutional layer 451, as well as the previous network/convolutional layers 411, are a 2-dimensional convolutional layer with a 1×1 filter (i.e., "Conv2d 1×1").

The output of the final convolutional layer 451 is processed by a batch-normalization layer 452, which is configured to perform a batch normalization process. The output of the batch-normalization layer 452 is fed to an activation layer, which is configured to apply an activation function. As depicted, the activation layer 453 is configured to apply a tan h-funcation activation function. The output of the activation layer 453 is fed to the average pooling layer 454, which is configured to perform a pooling operation. The pooling operation may, for example, calculate an average value for portions of a feature map. The output of the average pooling layer 454 establishes a real-valued query vector $q_{real}$.

The vector interface 440 is configured to bipolarize the real-valued query vector $g_{real}$ into a bipolar or bipolarized query vector $q_{bp}$.

Figures 5, 6:
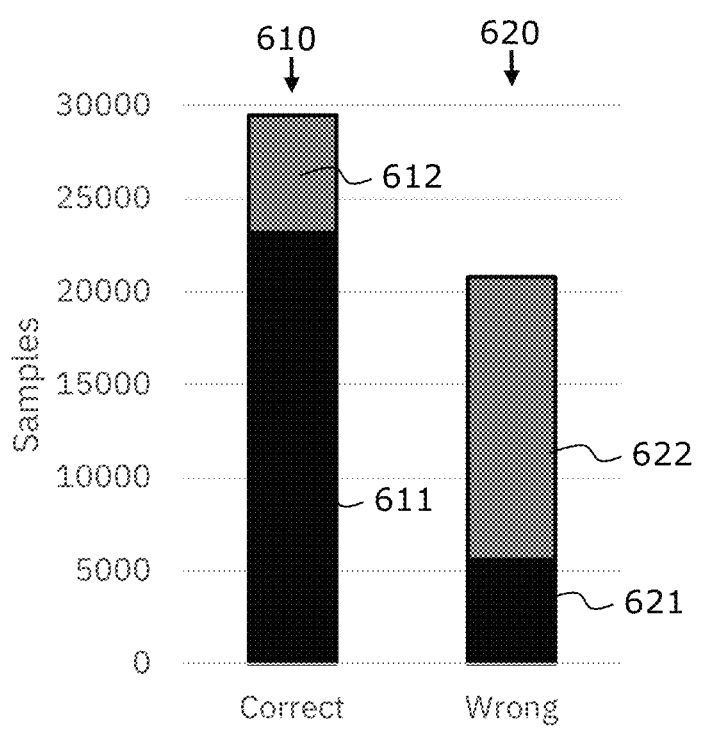
FIG. 5 is a table, generally designated 500, listing experimental results of various neural networks in accordance with embodiments of the present invention.
FIG. 6 is a graph, generally designated 600, depicting computational results of test queries in accordance with embodiments of the present invention.

FIG. 5 is a table, generally designated 500, listing experimental results of various neural networks in accordance with embodiments of the present invention. As depicted in FIG. 5, column 510 lists the classification accuracy in % for the interface 450 of FIG. 4b and column 520 lists the classification accuracy in % for the interface 430 of FIG. 4a. Row 530 lists the result for a neural network comprising a fixed bipolar resonator network which processes real-valued query vectors great. More particularly, row 530 lists the results of the neural network 400a of FIG. 4a and neural network 400b of FIG. 4b without the use of vector interface 440. Meanwhile, row 540 lists the results of neural network 400 a of FIG. 4a and neural network 400b of FIG. 4b utilizing a fixed bipolar resonator network having the vector interface 440 configured to perform a bipolarization of the query vector $q_{real}$ to form the bipolarized query vector $q_{bp}$.

As demonstrated by table 500 of FIG. 5, the bipolarization of the query vector only results in a small loss in accuracy. On the other hand, as bipolar operations may be performed significantly faster, the implementation of the vector interface 440 provides a significant speed advantage. As further demonstrated by table 500 of FIG. 5, interface 430 is advantageous in terms of accuracy over interface 450.

FIG. 6 is a graph, generally designated 600, depicting computational results of test queries in accordance with embodiments of the present invention. More particularly, graph 600 illustrates results for a neural network comprising a fixed bipolar resonator network which processes real-valued query vectors $g_{real}$, and has an interface with the sharpened tan h-10× activation function corresponding to interface 430 of FIG. 4*a*. With respect to FIG. 6, it can be assumed that the estimate of the last iteration is chosen in case of a non-convergence.

As depicted by graph 600, such a resonator network produces a classification accuracy of approximately 59%. The left bar 610 shows the results for a correct classification. More particularly, 611 shows the number of converged cases and 612 shows the number of non-converged cases. The right bar 620 shows the results for an incorrect classification. More particularly, 621 shows the number of converged cases and 622 shows the number of non-converged cases.

As can be derived from FIG. 6, in the case of a correct classification, the percentage of converged cases is significantly higher than the percentage of non-converged cases. On the other hand, in the case of a wrong classification, the percentage of non-converged cases is significantly higher than the percentage of converged cases.

Figure 7:
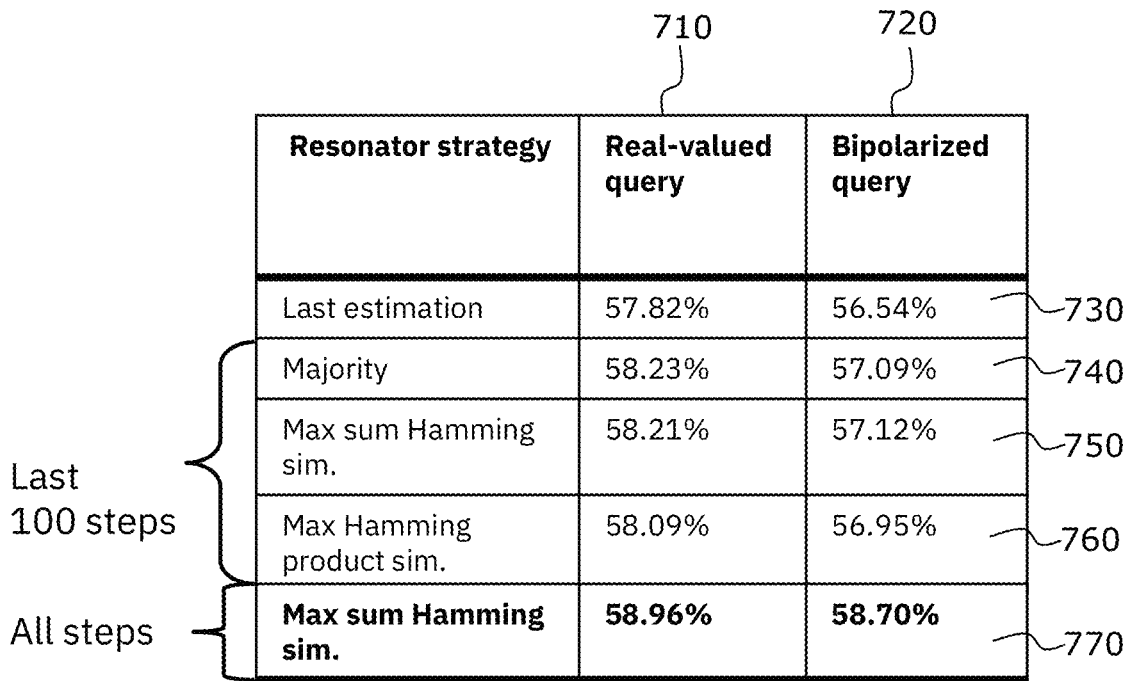
FIG. 7 is a table, generally designated 700, listing experimental results of different substitute decoding strategies utilized when a particular decoding of a resonator network does not converge.

FIG. 7 is a table, generally designated 700, listing experimental results of different substitute decoding strategies utilized when a particular decoding of a resonator network does not converge. More particularly, column 710 lists the classification accuracy in % for the resonator based neural network 400*a* shown in FIG. 4*a* without the use of a vector interface 440, while column 720 lists the classification accuracy in % for the resonator based neural network 400*a* shown in FIG. 4*a* with the use of vector interface 440. It should be noted that the decoding strategy may also be denoted as resonator strategy.

In an embodiment, the resonator based neural network 400*a* may select, in cases in which the factorization of the query vector to the codebook vectors does not converge, the estimation of the last iteration. Row 730 shows the results for when, in the case that the factorization of the query vector to the codebook vectors does not converge, the estimation of the last iteration is selected as the decoding strategy.

In an embodiment, the resonator based neural network 400*a* may select, in cases in which the factorization of the query vector to the codebook vectors does not converge, the factorization which has occurred most often within a predefined set of iterations. This may also be denoted as the "majority" decoding strategy. Row 740 shows the results for when, in the case that the factorization of the query vector to the codebook vectors does not converge, the factorization which has occurred most often in the last 100 iteration steps is selected as the decoding strategy.

In an embodiment, the resonator based neural network 400*a* may select, in cases in which the factorization of the query vector to the codebook vectors does not converge, the factorization within a predefined set of iterations which has the maximum sum Hamming similarity to a respective combination of vector products of the codebook vectors (or in other words, to the correct factors in the dictionary). This may be denoted as "maximum sum Hamming similarity." Row 750 shows the results for when, in the case that the factorization of the query vector to the codebook vectors does not converge, the factorization within the last 100 iterations which has the maximum sum Hamming similarity is selected as the decoding strategy. such a resonator strategy. Such a resonator strategy may be expressed with a formula as follows:

$$\hat{\imath} = \underset{i\in iter}{\operatorname{argmax}} \; \max(\operatorname{abs}(a_x[i])) + \max(\operatorname{abs}(a_y[i])) + \max(\operatorname{abs}(a_z[i]))$$

In the above formula $a_x[i]$, $a_y[i]$ and $a_z[i]$ are the similarity vectors of the respective iteration i of the last 100 iterations, wherein $\hat{\imath}$ is the iteration which provided the maximum sum Hamming similarity within the last 100 iterations. In other words, the factorization with the highest confidence is chosen.

In an embodiment, the resonator based neural network 400*a* may select, in cases in which the factorization of the query vector to the codebook vectors does not converge, the factorization within a predefined set of iterations with the maximum Hamming similarity between the query vector and a respective estimated vector product. This may be denoted as "maximum Hamming product similarity." Row 760 shows the results for when, in the case that the factorization of the query vector to the codebook vectors does not converge, the factorization within the last 100 iterations which has the maximum Hamming similarity between the query vector and a respective estimated vector product is selected as the decoding strategy. Such a strategy may be expressed with a formula as follows:

$$\hat{\imath} = \underset{i\in iter}{\operatorname{argmax}} \langle q, \hat{x}[i] \odot \hat{y}[i] \odot \hat{z}[i] \rangle.$$

In the above equation, q is the query vector, $\hat{x}[i]$, $\hat{y}[i]$ and $\hat{z}[i]$ are the estimated factors of the vector product and I is the iteration which provided the maximum Hamming product similarity within the last 100 iterations.

In an embodiment, the resonator based neural network 400*a* may select, in cases in which the factorization of the query vector to the codebook vectors does not converge, the factorization within a predefined set of iterations with the maximum Hamming similarity between the query vector and the last estimated product vector. This may be denoted as "maximum sum Hamming similarity." Row 770 shows the results for when, in the case that the factorization of the query vector to the codebook vectors does not converge, the factorization within all iterations which has the maximum Hamming similarity between the query vector and the last estimated vector is selected as the decoding strategy. As can be derived from table 700, the latter decoding strategy provides the highest accuracy.

Figure 8:
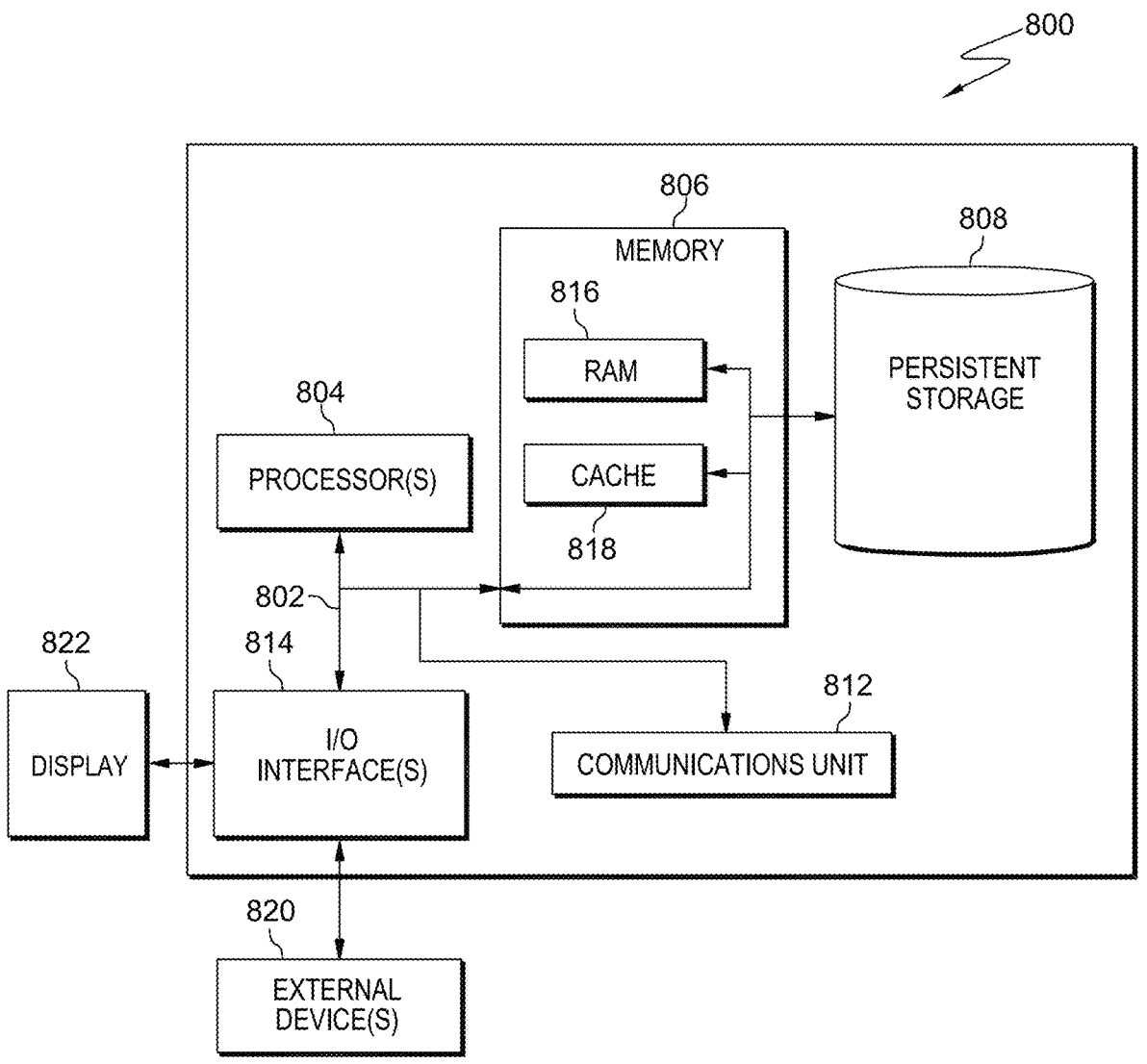
FIG. 8 is a block diagram depicting components of an exemplary computing device, generally designated 800, suitable for practicing various embodiments of the present invention.

FIG. 8 is a block diagram depicting components of a computing device, generally designated 800, suitable for practicing various embodiments of the present invention. Computing device 800 includes one or more processor(s) 804 (including one or more computer processors), communications fabric 802, memory 806 including, RAM 816 and cache 818, persistent storage 808, communications unit 812, I/O interface(s) 814, display 822, and external device(s) 820. It should be appreciated that FIG. 8 provides only an illustration of one embodiment and does not imply any limitations with regard to the environments in which different embodiments may be implemented. Many modifications to the depicted environment may be made.

As depicted, computing device 800 operates over communications fabric 802, which provides communications between computer processor(s) 804, memory 806, persistent storage 808, communications unit 812, and input/output (I/O) interface(s) 814. Communications fabric 802 can be implemented with any architecture suitable for passing data or control information between processor(s) 804 (e.g., microprocessors, communications processors, and network processors), memory 806, external device(s) 820, and any other hardware components within a system. For example, communications fabric 802 can be implemented with one or more buses.

Memory 806 and persistent storage 808 are computer readable storage media. In the depicted embodiment, memory 806 includes random-access memory (RAM) 816 and cache 818. In general, memory 806 can include any suitable volatile or non-volatile one or more computer readable storage media.

Program instructions used to practice various embodiments of the present invention can be stored in persistent storage 808, or more generally, any computer readable storage media, for execution by one or more of the respective computer processor(s) 804 via one or more memories of memory 806. Persistent storage 808 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 can include one or more network interface cards. Communications unit 812 may provide communications through the use of either or both physical and wireless communications links. In the context of some embodiments of the present invention, the source of the various input data may be physically remote to computing device 800 such that the input data may be received, and the output similarly transmitted via communications unit 812.

I/O interface(s) 814 allows for input and output of data with other devices that may operate in conjunction with computing device 800. For example, I/O interface(s) 814 may provide a connection to external device(s) 820, which may be as a keyboard, keypad, a touch screen, or other suitable input devices. External device(s) 820 can also include portable computer readable storage media, for example thumb drives, portable optical or magnetic disks, and memory cards. Software and data used to practice embodiments of the present invention can be stored on such portable computer readable storage media and may be loaded onto persistent storage 808 via I/O interface(s) 814. I/O interface(s) 814 also can similarly connect to display 822. Display 822 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
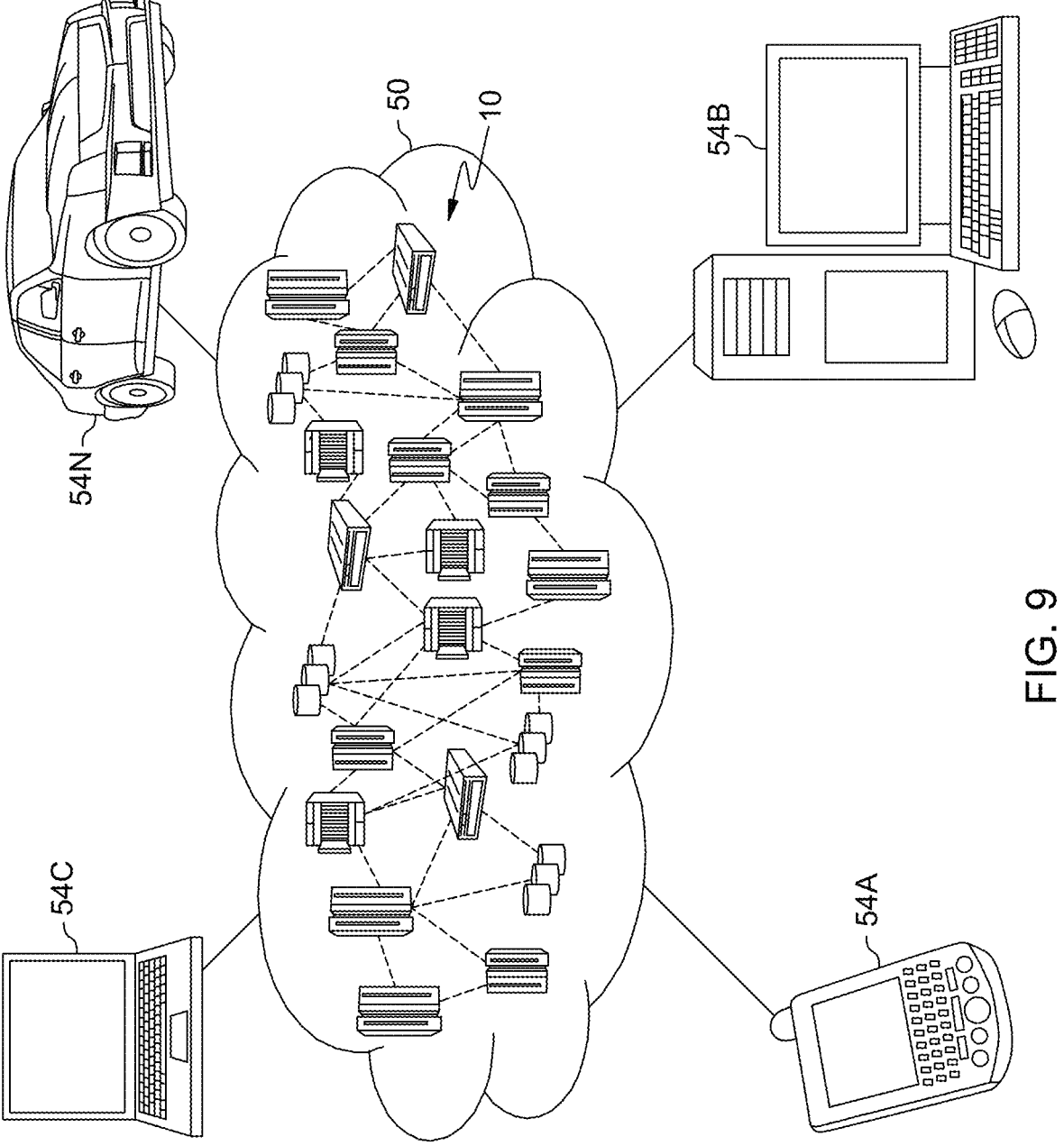
FIG. 9 is a block diagram depicting a cloud computing environment 50 in accordance with at least one embodiment of the present invention.

FIG. 9 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
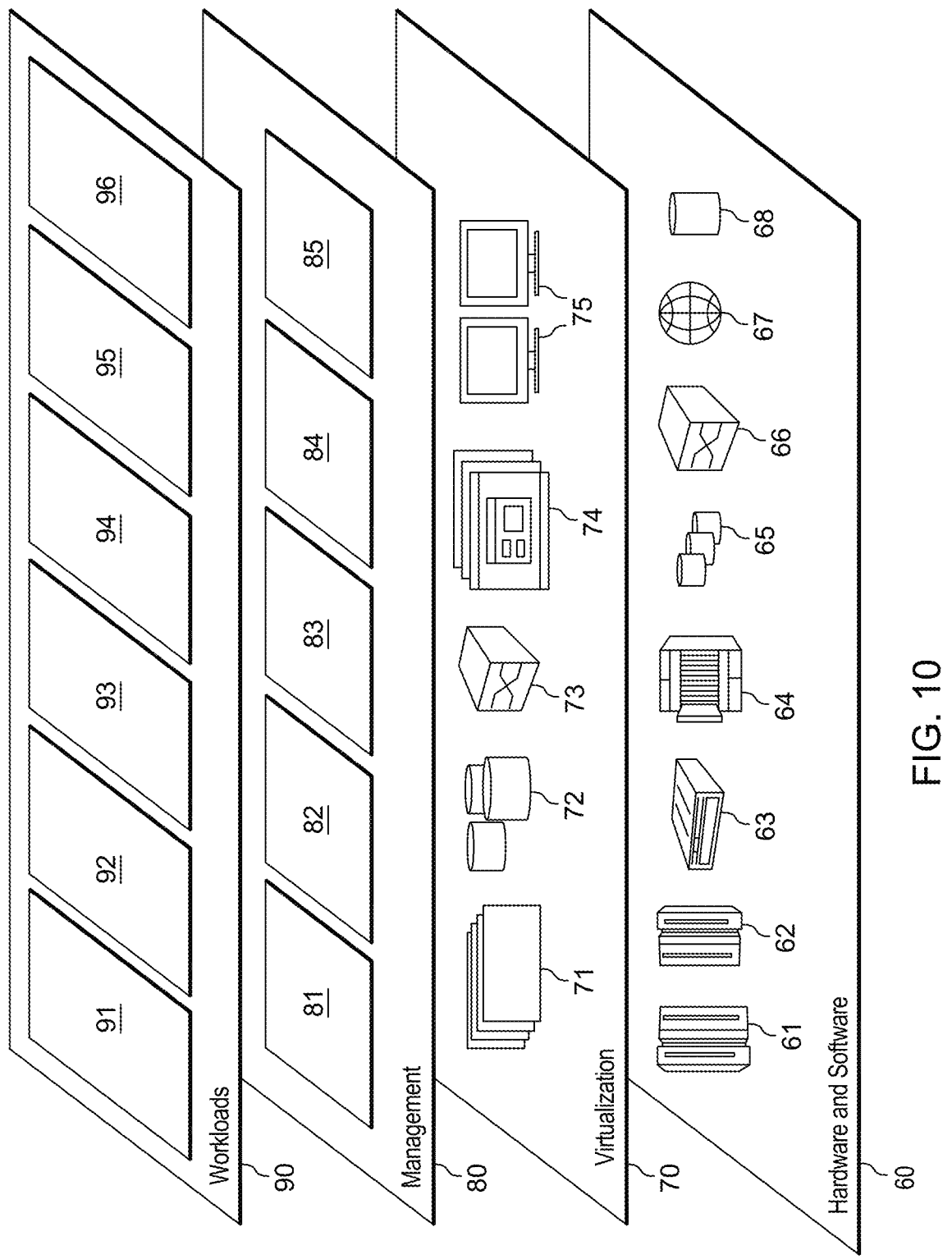
FIG. 10 is a block diagram of a set of functional abstraction model layers provided by cloud computing environment 50 depicted in FIG. 7 in accordance with at least one embodiment of the present invention.

FIG. 10 is block diagram depicting a set of functional abstraction model layers provided by cloud computing environment 50 depicted in FIG. 9 in accordance with at least one embodiment of the present invention. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classification using neural networks with various decoding strategies when factorization of a query vector to codebook vectors does not converge 96.

What is claimed is:

1. A computer-implemented method for performing a classification of an input signal utilizing a neural network, comprising:

computing, by a feature extraction subnetwork of the neural network, a real-valued query vector from the input signal;

bipolarizing, by the neural network, the real-valued query vector computed by the feature extraction subnetwork of the neural network into a bipolarized query vector;

iteratively performing, by a resonator subnetwork of the neural network, a factorization of the bipolarized query vector, wherein iteratively performing the factorization of the bipolarized query vector includes estimating a vector product from a plurality of codebook vectors of a plurality of codebooks, wherein the estimated vector product is formed from a respective codebook vector selected from each of the plurality of codebooks; and responsive to the factorization of the bipolarized query vector converging with respect to the estimated vector product, assigning a class corresponding to the estimated vector product to the query vector.

2. The computer-implemented method of claim 1, wherein:

the bipolarized query vector is a D-dimensional query vector;

the number of classes of the resonator subnetwork is C, wherein C and D are integers; and the number of classes C is higher than a dimension D of the D-dimensional query vector.

3. The computer-implemented method of claim 1, wherein the plurality of codebooks are fixed codebooks.

4. The computer-implemented method of claim 1, wherein the plurality of codebooks are bipolar codebooks including bipolar codebook vectors.

5. The computer-implemented method of claim 1, wherein the neural network further includes a vector interface between the feature extraction subnetwork and the resonator subnetwork, wherein the vector interface is configured to bipolarize the bipolarized query vector.

6. The computer-implemented method of claim 1, further comprising:

performing unbinding operations in parallel for the plurality of codebooks.

7. The computer-implemented method of claim 1, further comprising:

performing a training phase with respect to the feature extraction subnetwork, wherein a classification layer presented as the resonator subnetwork remains unchanged during the training phase.

8. The computer-implemented method of claim 7, wherein the training phase is configured to minimize a loss function, the loss function being computed as follows:

$$\mathcal{L}_{CET}(q_i, y_i) = -\log\frac{e^{scos\left(\theta_{q_i, w_{y_i}}+m\right)}}{e^{scos\left(\theta_{q_i, w_{y_i}}+m\right)} + \sum_{j \neq y_i} e^{scos\left(\theta_{q_i, w_j}\right)}},$$

whereinq$_i$ denotes a query vector of iteration i, w denotes the output vector of iteration i, and s and m are hyperparameters.

9. The computer-implemented method of claim 1, wherein the feature extraction subnetwork of the neural network includes an activation layer, and further wherein the activation layer is configured to apply a tanh-function as an activation function.

10. The computer-implemented method of claim 1, wherein the feature extraction subnetwork of the neural network includes a pooling layer and an activation layer, and further wherein the pooling layer is arranged prior to the activation layer.

11. The computer-implemented method of claim 10, wherein the pooling layer is an average pooling layer.

12. The computer-implemented method of claim 10, wherein the activation layer is configured to apply a sharpened tanh-function as an activation function.

13. The computer-implemented method of claim 1, further comprising:

responsive to the factorization of the bipolarized query vector not converging with respect to any estimated vector product, selecting the factorization which has occurred most often within a predefined set of iterations.

14. The computer-implemented method of claim 1, further comprising:

responsive to the factorization of the bipolarized query vector not converging with respect to any estimated vector product, selecting the factorization within a predefined set of iterations which has a maximum sum Hamming similarity to a respective combination of vector products of the plurality of codebook vectors.

15. The computer-implemented method of claim 1, further comprising:

responsive to the factorization of the bipolarized query vector not converging with respect to any estimated vector product, selecting the factorization within a predefined set of iterations with a maximum Hamming similarity between the bipolarized query vector and a respective estimated vector product.

16. A computer program product for performing a classification of an input signal by a neural network, the computer program product comprising one or more computer readable storage media and program instructions stored on the one or more computer readable storage media, the program instructions including instructions to:

compute, by a feature extraction subnetwork of the neural network, a real-valued query vector from the input signal;

bipolarize, by the neural network, the real-valued query vector computed by the feature extraction subnetwork of the neural network into a bipolarized query vector;

iteratively perform, by a resonator subnetwork of the neural network, a factorization of the bipolarized query vector, wherein iteratively performing the factorization of the bipolarized query vector includes estimating a vector product from a plurality of codebook vectors of a plurality of codebooks, wherein the estimated vector product is formed from a respective codebook vector selected from each of the plurality of codebooks; and responsive to the factorization of the bipolarized query vector converging with respect to the estimated vector product, assign a class corresponding to the estimated vector product to the bipolarized query vector.

17. A computer system for performing a classification of an input signal by a neural network, comprising:

one or more computer processors;

one or more computer readable storage media;

computer program instructions, the computer program instructions being stored on the one or more computer readable storage media for execution by the one or more computer processors; and the computer program instructions including instructions to:

compute, by a feature extraction subnetwork of the neural network, a real-valued query vector from the input signal;

bipolarize, by the neural network, the real-valued query vector computed by the feature extraction subnetwork of the neural network into a bipolarized query vector;

iteratively perform, by a resonator subnetwork of the neural network, a factorization of the bipolarized query vector, wherein iteratively performing the factorization of the bipolarized query vector includes estimating a vector product from a plurality of codebook vectors of a plurality of codebooks, wherein the estimated vector product is formed from a respective codebook vector selected from each of the plurality of codebooks; and responsive to the factorization of the bipolarized query vector converging with respect to the estimated vector product, assign a class corresponding to the estimated vector product to the bipolarized query vector.

* * * * *